Figure 1:
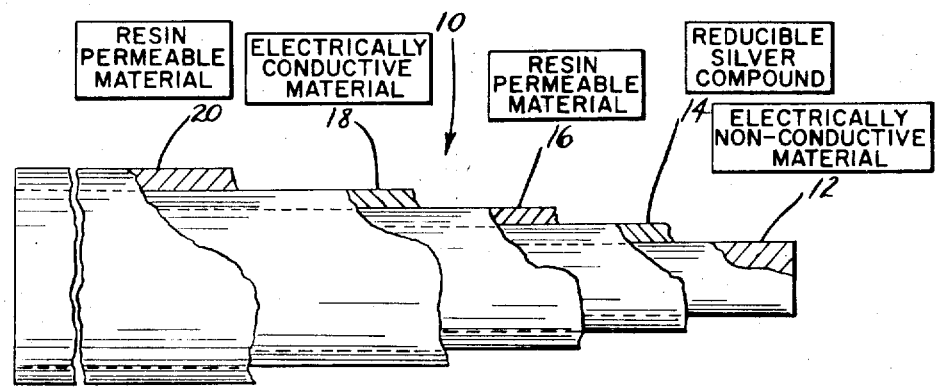

United States Patent [19]

Fiedler

[11] 3,725,927

[45] Apr. 3, 1973

[54] DISAPPEARING-REAPPEARING RADAR CHAFF AND METHOD FOR PRODUCTION

[75] Inventor: William S. Fiedler, Madison, Wis.

[73] Assignee: The United States of America as represented by the Secretary of the Air Force

[22] Filed: Dec. 27, 1962

[21] Appl. No.: 248,188

[52] U.S. Cl..............................343/18 E, 343/18 B
[51] Int. Cl................................................G01s 7/42
[58] Field of Search......................................343/18 B

[56] References Cited

UNITED STATES PATENTS 3,544,997 12/1970 Turner et al. .........................343/18 B
3,518,670 6/1970 Miller ..................................343/18 B

FOREIGN PATENTS OR APPLICATIONS 639,740 7/1950 Great Britain ......................343/18 B Primary Examiner—Benjamin A. Borchelt
Assistant Examiner—N. Moskowitz
Attorney—Wade Koontz and Louis E. Hay

[57] ABSTRACT

Dispersable radar chaff having the characteristic of intermittently being electrically reflective and non-reflective, and comprising an inert core element progressively surrounded by alternated layers of reducable metallic salt, resin permeable material and oxidizeable metal, the chaff so formed being activated before dispersion by application of an oxidizing-reducing agent, said agent in progressively working its way inward alternately oxidizing a metallic layer to become non-reflective, and reducing a metallic salt layer to become reflective.

8 Claims, 2 Drawing Figures

INVENTOR.
WILLIAM S. FIEDLER

DISAPPEARING-REAPPEARING RADAR CHAFF AND METHOD FOR PRODUCTION

This invention is directed in general to the field of radar chaff and, more particularly, to the method of utilizing chemical compounds to produce chaff whose reflective characteristics may be made to disappear and reappear at intervals.

Radar chaff, which is generally composed of relatively short filaments of conductive fibers, is used to deceive or confuse ground radar installations and render them ineffective. Because of electrical conductivity, each filament of chaff acts as a dipole which registers upon the radar screen and produces a deceptive reading. When such filaments become nonconductive as by deactivation, the radar apparatus will not detect the chaff. Hence, by alternately deactivating and reactivating the chaff, a reading is produced on the radar screen which resembles a moving target, or a target which is detected and lost. Such operation, to say the least, causes great confusion.

It has been found that disappearing-reappearing chaff, as contemplated by this invention, may be produced by applying on fiber glass or plastic such as polyethylene terephalate separate coatings or layers of reducible metallic salt and oxidizable metal; and then applying a liquid solution or dispersion containing a chemical which will first oxidize the metallic coating and then reduce the coating containing the reducible metallic salt. In this manner, a chaff is produced that will give intermittent readings on a radar screen due to its ability to become first nonconductive due to the oxidation of the outer conductive metal coating and then conductive due to the reduction of the metallic salt.

An object of this invention is to produce radar chaff which is intermittently conductive and nonconductive.

A further object of this invention is to provide radar chaff having controlled intervals for being conductive or nonconductive.

Another object of this invention is to provide a radar chaff which will produce a reading on a radar screen which is similar to the reading from a moving object.

Figure 2:
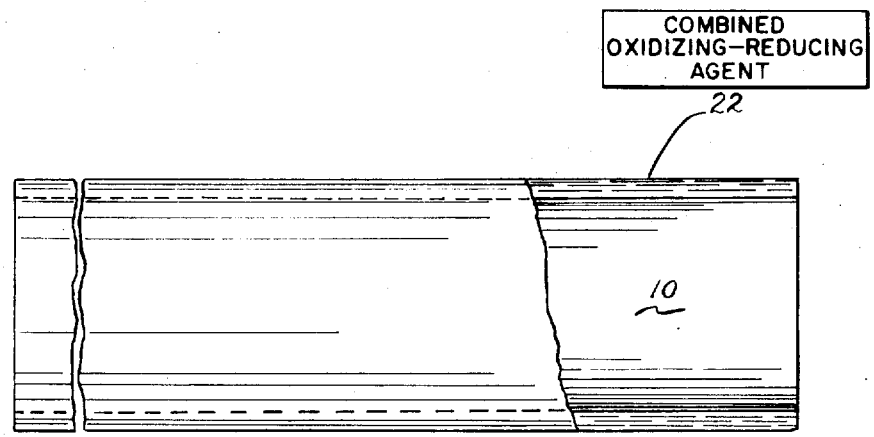

The invention is further illustrated by the following examples which illustrate certain embodiments but are not to be taken as limiting the invention only to the embodiments shown, it being understood that other embodiments and equivalents will be apparent to those skilled in the art after the following description and drawings in which:

FIG. 1 is a schematic drawing in partial section of chaff as contemplated by this invention, and FIG. 2 is the chaff shown on FIG. 1, which, prior to dispersion into the atmosphere, is treated with a chemical solution to produce the intermittent disappearing-reappearing effect.

The radar chaff of this invention, referred to generally as chaff 10, may comprise as its inner or core layer 12 any suitable electrically nonconductive material such as fiber glass, thermoplastic or thermosetting resins such as mylar, nylon, dacron, orlon, rayon, etc.; paper and natural fibers such as wool, cotton, silk or line. Any material may be selected in either filament or sheet form providing such material is electrically nonconductive.

Applied to core 12, as hereinafter described, is a first coating or layer of a reducible silver compound 14 such as silver nitrate, silver nitrite, silver chloride, silver bromide, silver fluoride, or silver iodide. This coating may be applied by any suitable coating technique for obtaining a thin layer of relatively uniform thickness such as by brushing, spraying or dipping. Preferably, it is applied by using standard coating equipment such as a knife coater, reverse roll coater, or the like. It is particularly suitable to coat with a transfer roll dipping into a pan of coating material and having the other side of the roll contacting the core material. After passing over the roll, the web is then passed over a Mayer equalizer rod consisting of a rod of about one quarter inch diameter wound with wire in the form of a tight coil or helix, the wire being of the order of No. 6 wire.

The reducible silver salt 14 is an electrically nonconductive layer. Upon treatment with a reducing agent, the silver salt is reduced to metallic silver which is electrically conductive to thus make the chaff conductive.

Applied to the outside of the layer of silver salt 14 is a first layer of resin permeable material 16. The layer of silver salt 14 will remain nonconductive for a predetermined period depending upon the thickness and the material used as the resin permeable coating 16. In this manner, the chaff is rendered nonconductive and no reading is recorded on the radar screen until the reducing agent penetrates through the resin permeable material and into contact with the silver salt. By selection of a suitable resin permeable material, and by controlling the thickness with which applied, the time of appearance after the reducing agent reaches the surface of the resin permeable material is controlled. This resin permeable layer 16 may be made from the common semi-permeable materials such as gelatin, colloidal silica, or sodium silicate, to mention a few. The resin permeable layer may be applied by any of the conventional coating procedures above mentioned.

A layer of electrically conductive material 18 is next placed over the semi-permeable resin coating 16. This metallic layer provides the initial electrical conductivity of the chaff, permitting the chaff to give readings on the radar screen. Any metallic metal may be used as the metallic layer, as for example: aluminum, magnesium, copper, silver and zinc. The characteristic of the metal is such that it can be deactivated or rendered nonconductive when attached by a suitable oxidizing agent. The electrically conductive material 18 may be applied on the resin permeable material 16 by any conventional coating procedure. The rate of the initial disappearance of the chaff from detection on the radar screen may be controlled by the thickness of the metallic layer. This is true since the chaff will disappear initially from the radar screen when the metallic layer is rendered nonconductive due to it oxidation by the oxidizing and reducing agent.

Although chaff in accordance with this invention may be produced without such final layer, the rate of initial disappearance of the chaff from detection may be further controlled by applying another coating 20 of the semi-permeable material heretofore mentioned upon the layer of conductive metal. This layer will provide a time delay before the oxidizing and reducing agent reaches the metallic layer and renders the chaff nonconductive.

The chaff produced by the above described procedure is made to disappear and reappear on the radar screen by the chemical action of a combined oxidizing-reducing agent 22 shown Upon reaching the metallic layer, the reading given by the chaff will disappear since the metallic layer will be rendered nonconductive by oxidation to its salt. After penetrating through the metallic layer, the agent penetrates through permeable layer 16 and into the layer 14 of silver salt. After contacting the silver salt, the agent will reduce the silver salt to conductive silver causing the chaff to be reactivated and rendered conductive, to again produce readings on the radar screen.

An oxidizing-reducing agent 22 may be prepared of a strong base such as potassium hydroxide or sodium hydroxide together with sodium hyposulfite. The mixture may be in the form of a liquid dissolved in any conventional solvent such as alcohol or other volatile low freezing solvent, and applied to the chaff before the chaff is dropped from an airplane or dispersed into the air by other means. The solvents also prevent the sticking together of individual pieces of chaff which would otherwise normally occur in the presence of moisture. By regulating the amount of sodium hyposulphite in the solution, the rate of reduction of the silver salt layer may be increased or decreased as desired. This provides a means of regulating the time of reappearance of the chaff after disappearance. Potassium nitrate may be added in like manner to increase the rate at which the metallic layer oxidizes. By increasing or decreasing the amount of potassium nitrate, the rate of oxidation may be increased or decreased as desired.

From the above disclosure, it is obvious that disappearing-reappearing chaff may be made using any number of layers; within limits, of the materials disclosed. Likewise, that the order of disappearance and reappearance may be reversed by changing the order of application on the core, or by adding an additional silver salt layer to the outside of the chaff illustrated. Hence, the disclosure should be taken in an illustrative rather than in a limiting sense; and it is the desire and intention to reserve all modifications within the scope of the appended claims.

I claim:

1. Disappearing-reappearing radar chaff chemically activatable by an oxidizing-reducing agent and comprising: an electrically inert core, one or more coaxial layers of metallic salt about said core, one or more coaxial layers of metallic material alternately spaced with said layers of metallic salt, said metallic salt being reducible by said agent and said metallic material being oxidizable by said agent, and a coaxial layer of permeable material between each layer of metallic salt and metallic material.

2. Disappearing-reappearing radar chaff chemically activatable by an oxidizing-reducing agent and comprising: an electrically inert core, one or more coaxial layers of metallic salt about said core, one or more coaxial layers of metallic material alternatly spaced with said layers of metallic salt, said metallic salt being reducible by said agent and said metallic material being oxidizable by said agent, and a plurality of coaxial layers of permeable material one of which is between each layer of metallic salt and metallic material and one of which forms the outer layer of the chaff so formed.

3. Disappearing-reappearing radar chaff chemically activatable by an oxidizing-reducing agent and comprising: an electrically inert core, one or more coaxial layers of metallic salt about said core and having the inner layer joined to said core, one or more coaxial layers of metallic material alternately spaced with said layers of metallic salt, said metallic salt being reducible by said agent and said metallic material being oxidizable by said agent, and a plurality of coaxial layers of permeable material one of which is between each layer of metallic salt and metallic material and one of which forms the outer layer of the chaff so formed.

4. Disappearing-reappearing radar chaff chemically activatable by an oxidizing-reducing agent and comprising: an electrically inert core, one or more coaxial layers of silver salt about said core, one or more coaxial layers of metallic material alternately spaced with said layers of silver salt, said silver salt being reducible by said agent and said metallic material being oxidizable by said agent, and a plurality of coaxial layers of resin permeable material one of which is between each layer of silver salt and metallic material and one of which forms the outer layer of the chaff so formed.

5. Disappearing-reappearing radar chaff chemically activatable by an oxidizing-reducing agent and comprising: an electrically inert core, one or more coaxial layers of silver salt about said core and having the inner layer joined to said core, one or more coaxial layers of metallic material alternately spaced with said layers of silver salt, said silver salt being reducible by said agent and said metallic material being oxidizable by said agent, and a plurality of coaxial layers of resin permeable material one of which is between each layer of silver salt and metallic material and one of which forms the outer layer of the chaff so formed.

6. Disappearing-reappearing radar chaff chemically activatable by an oxidizing-reducing agent and comprising: an electrically inert filament core, a layer of silver salt coaxial with and joined to the surface of said core, a first coaxial layer of resin permeable material joined to the surface of said layer of silver salt, a coaxial layer of metallic material joined to the surface of said first layer of resin permeable material, and a second coaxial layer of resin permeable material joined to the surface of said layer of metallic material, said silver salt being reducible by said agent and said metallic material being oxidizable by said agent.

7. The method of producing disappearing-reappearing radar chaff to be chemically activated by an oxidizing-reducing agent before dispersal into the atmosphere and comprising the steps of: applying a layer of metallic salt to an electrically inert core, then applying a first layer of permeable material to the surface of said metallic salt, then applying a layer of metallic material to the surface of said first layer of permeable material, and finally applying a second layer of permeable material to the surface of said metallic material.

8. The method of producing disappearing-reappearing radar chaff to be chemically activated by an oxidizing-reducing agent before dispersal into the atmosphere and comprising the steps of: applying a layer of silver salt to an electrically inert filament core, then applying a first layer of resin permeable material to the surface of said silver salt, then applying a layer of metallic material to the surface of said first layer of resin permeable material, and finally applying a second layer of resin permeable material to the surface of said metallic material.

* * * * *